United States Patent [19]

Svyatsky

[11] Patent Number: 4,979,605

[45] Date of Patent: Dec. 25, 1990

[54] DOCUMENT TRANSPORTER FOR USE IN FORWARDING SYSTEM

[75] Inventor: Eduard Svyatsky, Chicago, Ill.

[73] Assignee: Bell & Howell Company, Skokie, Ill.

[21] Appl. No.: 109,492

[22] Filed: Oct. 16, 1987

[51] Int. Cl.[5] .............................................. G06F 15/20

[52] U.S. Cl. .................................... 198/349; 364/478; 101/47; 198/345.1; 271/266; 209/900; 414/787

[58] Field of Search .................. 198/367, 367.1, 367.2, 198/349, 349.5, 349.6, 345; 101/47, 53, 45, DIG. 46; 364/478, 479, 900; 271/2, 265; 209/900, 942, 630, 610; 414/787, 677

[56] References Cited

U.S. PATENT DOCUMENTS

| | | | |
|---|---|---|---|
| 2,936,556 | 5/1960 | Gibson | 198/349 X |
| 3,596,093 | 7/1971 | Fridley | 104/47 X |
| 4,175,694 | 11/1979 | Donabin | 271/266 X |
| 4,403,954 | 9/1983 | Kokeguchi et al. | 198/345 X |
| 4,578,759 | 3/1986 | Horii | 364/478 |
| 4,646,245 | 2/1987 | Prodel et al. | 198/349 X |
| 4,796,196 | 1/1989 | Durst, Jr. et al. | 364/478 |
| 4,800,506 | 1/1989 | Axelrod et al. | 364/478 |

FOREIGN PATENT DOCUMENTS

| | | | |
|---|---|---|---|
| 95737 | 12/1983 | European Pat. Off. | 209/900 |
| 151272 | 11/1979 | Japan | 198/345 |

*Primary Examiner*—Frank E. Werner
*Attorney, Agent, or Firm*—Howard B. Rockman

[57] ABSTRACT

This invention relates in general to the handling of mail and, in particular, to an improved document transporter for use in a forwarding address system for mail sorting machines.

17 Claims, 3 Drawing Sheets

DOCUMENT TRANSPORTER FOR USE IN FORWARDING SYSTEM

BACKGROUND AND BRIEF DESCRIPTION OF THE INVENTION

The volume of mail and other documents handled daily by large businesses, institutions and governmental entities has steadily increased through the years. For example, credit card companies, utilities, mail order houses and other advertisers send and receive huge quantities of mail daily. Typically, the documents or envelopes containing the material to be mailed are addressed and then sorted into common groups for mailing. Similarly, mail received by such entities is commonly sorted into groups based upon the subject matter of the received material. A third category of such envelopes are the returned mail category the creation of which is primarily due to the addressee having moved from a particular address resulting in the envelope being undeliverable. The present invention is a system directed to the solution of this latter type of problem, namely, the correction of the address that will permit its proper delivery.

Several different types of machines have been developed to assist in the handling of such mail, other than manual review and correction by the individual mail carrier. These prior art devices typically comprised an envelope feeder, a read station, a selection of label station where a supply of labels permitter selection of an appropriate label and its application to an envelope, and a sorting and storage means.

None of these prior art machines and systems proved satisfactory since they were large unwieldly machines that required not only a large amount of space but also required frequent replenishment of a vast array of preprinted label supplies and applicating equipment.

The contemplated system provides a unique computer- operator controlled system with a plurality of unique stations that are suitable for use with conventional mail sorting machines as well as other document handling equipment.

The system includes a feeder module wherein incoming documents or envelopes are separated from each other and delivered to a unique transport module. The present invention relates to that unique transport module which moves the individual envelopes or documents sequentially to a plurality of "read" stations; observation means, then can be audible, visual, or tactile, such as a cathode ray tube (CRT) monitor, conveniently disposed for operator observation; and correction means, such as an input keyboard means tied to a main computer data source, for use and control by an operator.

Observation of indicia by the operator and selective input into the keyboard means results in an electable response by the operator, the elected information then being sent to a print module for use in creation of an appropriate corrective means.

The unique transport module generally includes a plurality of stations in each of which the operator has an unobstructed view of the entire side surface of the envelope while reading the address or other identifying data thereon. Once the address or zip code has been ready by the operator, the operator makes a codified entry which is processed by the computer, with which the machine is associated, and into which computer the changes of address have been introduced on a frequent periodic basis. If the limited information introduced by the operator is applicable to more than one individual addressee, alternatives will be displayed to the operator for the operator to choose from. The information so chosen is then forwarded to the next module and the envelope or document released for movement along the various stations in the transport module and thence out of the operators visual range serially into the next module.

Another object of the invention is to provide a document forwarding system of the type contemplated that includes this improved transport module within the system that will reliably operate over extended time parameters with minimal down times, as well as being relatively simple and economical to construct and operate.

Other and further objects of this invention, together with all of the features of novelty appurtenant thereto, will appear in the course of the following description.

DETAILED DESCRIPTION OF THE INVENTION

Figure 1:
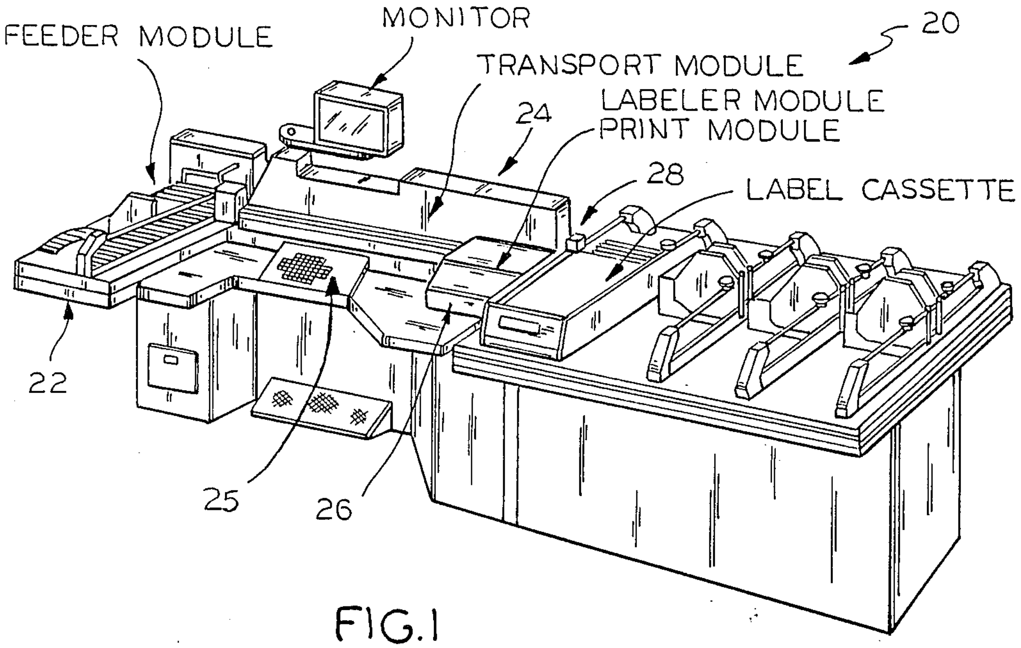
FIG. 1 is a perspective view of a system utilizing an embodiment of the present invention.

Referring now to the drawing, wherein similar parts are designated by similar numerals, and particularly FIG. 1, a computer assisted document forwarding system of the type contemplated by the present invention is generally designated by the numeral 20 and includes an integrated system of several modules, each of which in the forwarding system being discussed are interrelated with the other and mutually interdependent, but which under other circumstances can be independently operable for other functions. Such forwarding systems are designed to reduce the labor factor involved in updating a mailing list and also to forward mail that has been erroneously deposited at a local post office.

A system of the type contemplated by the present invention would include a feeder module 22, a transport module 24 which has a plurality of observation means stations, a print module 26, a labeler module 28, a label cassette 30, and a sorting and stacking module 32. It is such a system,, referred to earlier, that can be used by the local post offices where documents, i.e., mail envelopes of various sizes, have been stopped because a customer has entered a change of address order and hence existing documents are not properly addressed for delivery purposes. It is recognized that there are a broad variety of applications for such a system, other than postal usage, in the catalogue, credit card, mail order/-mail system categories and any others where a billing or form of address means must accommodate changes in address. It provides a ready update system and reduces the labor expenses by providing an accurate, readily available listing of correct addresses for immediate application to a document. The system is basically an ancillary arm to a master computer where all of the address changes are fed and maintained for a predetermined time frame. The information in the master computer is made available to the subsidiary or remote stations for use by an operator to update on a ready basis the address to which particular pieces of mail are to be forwarded.

To broadly describe the operation of the device, a plurality of documents or envelopes are fed sequentially in serial fashion, one at a time to the first of the plurality of observation means stations located in the transport module 24. The operator reads the address of the document and types into the computer an abbreviated version of the address, for example, the first three letters of the addressee's last name and the last two digits of the zip code. The keyboard 25 being the input mechanism into an electronic information storage means (not shown) interconnected with the input means also serves as a retrieval means to inform the operator. Normally, where there is only one combination of such letters and digits on file, the computer automatically selects the proper address. If there are more than one possible responses to the input they all are provided to the operator, for example, they can be visually displayed on a cathode ray tube (CRT), however, audible or tactile means could also be used. The operator then selects the correct one and continues the operation by striking an appropriate key. The document is then fed to a buffer station on the transport module 24 where it remains while corrective means are chosen from the selected data fed to it by the computer. The document is then released from the buffer station and transported to the next module 28 where the correct address information for the particular addressee is applied to the document. It is then moved through and to the sorter and stacker, which movement can also be controlled on the basis of the same data fed from the computer to the corrective module so that it is immediately broadly sorted for delivery to the correct address.

Figure 2:
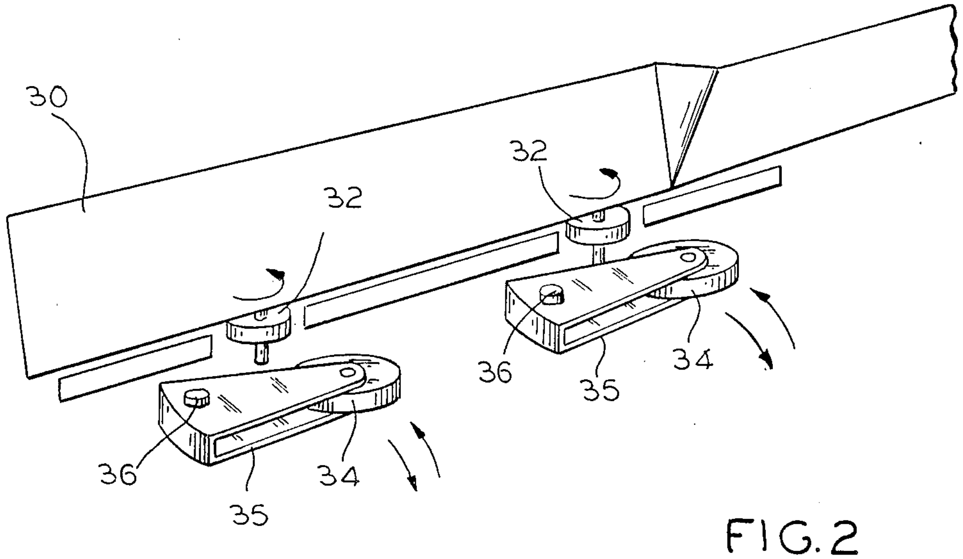
FIG.2 PRIOR ART
FIG. 2 is a partial perspective view of a prior art transport module.

FIG. 2 is broadly representative of a prior art type of transport module. A document or envelope was delivered from a feeder module to a position on the upper supporting surface of the module, not shown, in front of an elongated guide 30 that projects outwardly over the supporting means of the module and is positioned above one or more constantly rotating rollers 32 that project outwardly beyond the plane of the lower edge 31 of guide 30. It was necessary to provide envelope pressure against the rotating rollers 32 as by a similar number of moveable rollers 34 to ensure movement of the envelopes. The rollers 34 illustrated in FIG. 2 were each mounted on an arm 35 capable of oscillation about a fixed pivot 36, with each arm powered by suitable means, not shown, to force the envelopes, not shown, into engagement with the constantly rotating rollers 32.

This prior art had several disadvantages. A few of the primary objections being the disposition of the oscillating arm mechanism in front of the envelope, with the resultant disturbance of the operator both from a noise and motion standpoint. Additionally, the illustrated mechanism does not stop the motion of the envelope at a constant position each time, due to the inertia of the document. The exposed mechanism was also subject to collection of dust and dirt that resulted in a requirement for an undue amount of maintenance. The combination of these problems made the prior art mechanism highly undesirable.

Figure 3:
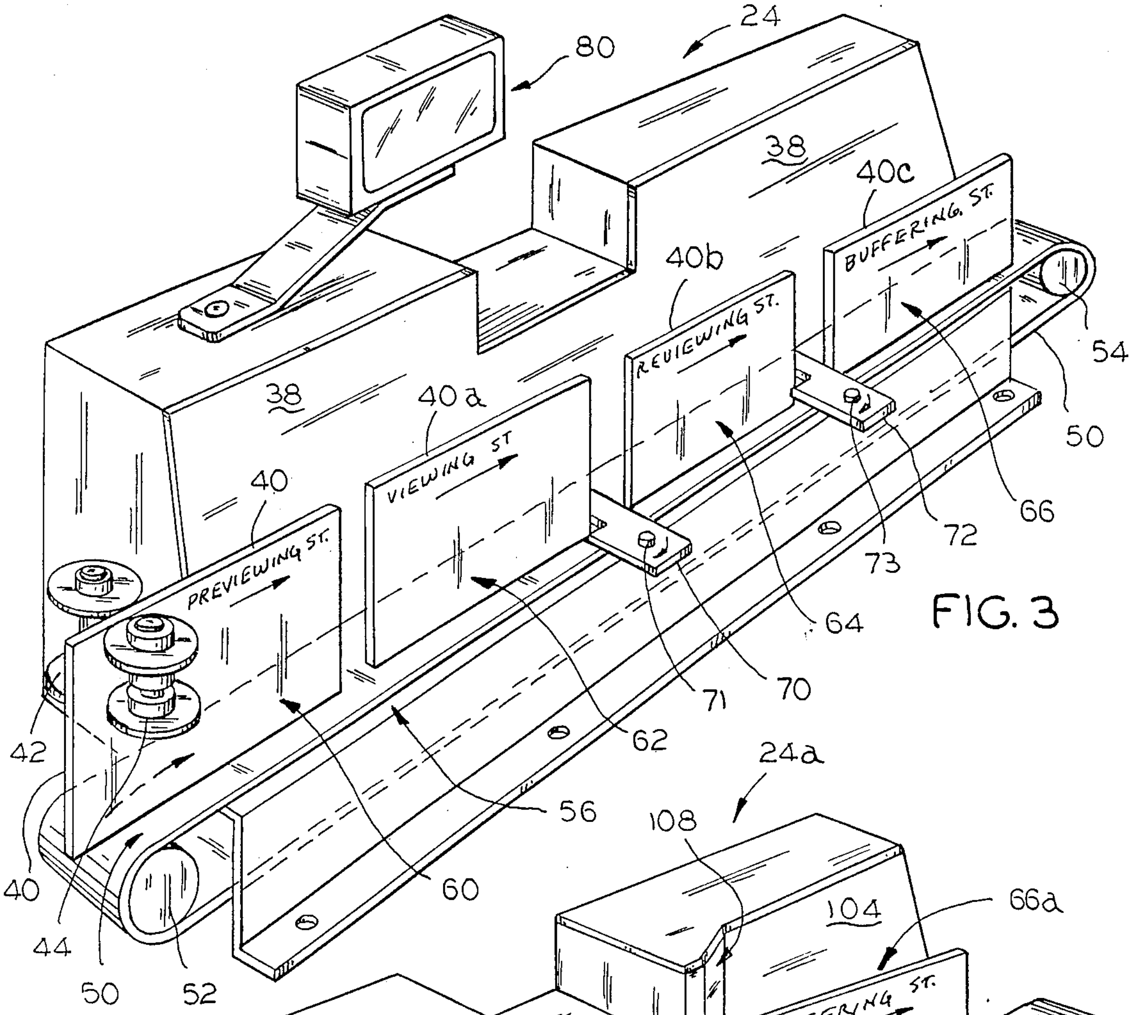
FIG. 3 is a partial perspective view of a preferred embodiment of the transport module showing the various viewing stations thereon.

Referring now to FIG. 3, a transport module 24 of the type contemplated by the present invention includes a plurality of viewing stations disposed on a generally vertically disposed panel member 38, canted slightly to the rearward, and extending upwardly from a desk-like operator station, as best seen in FIG. 1. These viewing stations provide the operator a full view of the broad front or address side of the envelope for reading and correcting purpose. As the envelope 40 comes out of engagement with the last double pair of feed rollers 42 and 44, the envelope 40 engages and transfers to a moving belt 50 riding on rollers 52 and 54. The belt 50 is supported by a lubricious frame member 56. The envelope 40 is shown in the first or previewing station 60; the envelope **40*a* is shown in the viewing station 62 where the envelope 40*a* abuts and is temporarily restrained against movement with the belt 50 by the stop means 70. The serially next preceding envelope 40*b* is positioned in the reviewing station 64 where the envelope is held in a temporarily restrained configuration by the stop 72. The last station in the transport module is a buffering or holding station 66 illustrated by envelope designated 40*c***. (The indicated names and arrows are purely for purposes of illustration only and are not meant to be limiting.)

As the envelope 40 proceed across in front of the operator, the operator reads the address and the name of the addressee in the previewing station and in the viewing station. In the viewing station 62, the operator types the coded information into a computer keyboard terminal, not shown in this figure, which information is fed into the computer having the corrected information. After typing in the last digit of the code and viewing it on a monitor 80, the program in the computer causes the stop means 70 and 72 to be simultaneously activated and rotated about pivots 71 and 73, respectively, which causes the stop means or fingers 70 and 72 to be moved out of the way and permit envelope **40*a* to move with the belt 50 into the position of 40*b*; and similarly envelope 40*b* to move into the buffering station, as shown with envelope 40*c*. Activation of the stop means 70 and 72** can be equated to that of a pair of simultaneously opening gates that permit those items on the moving belt to be passed to the next station.

When an envelope **40*a* moves to the reviewing station 64 the operator will look at the monitor 80 to determine whether there is a possibility of a multiple choice from the code type in when the envelope was at viewing station 62. If this multiple choice exists, the operator will make the necessary selection to correspond go the remainder of the information that had not been fed into the computer with the abbreviated code. Selection of one of the choices will then be made and the envelope passed on to the buffering station 66. It should be noted that the envelope 40*c* will be retained in the buffering station 66 until the printing operation has been completed and the label ready to be applied to envelope 40*c*. Needless to say, the stop 72 would not be activated until buffering station 66** has been cleared and available to accept the next envelope.

Figure 5:
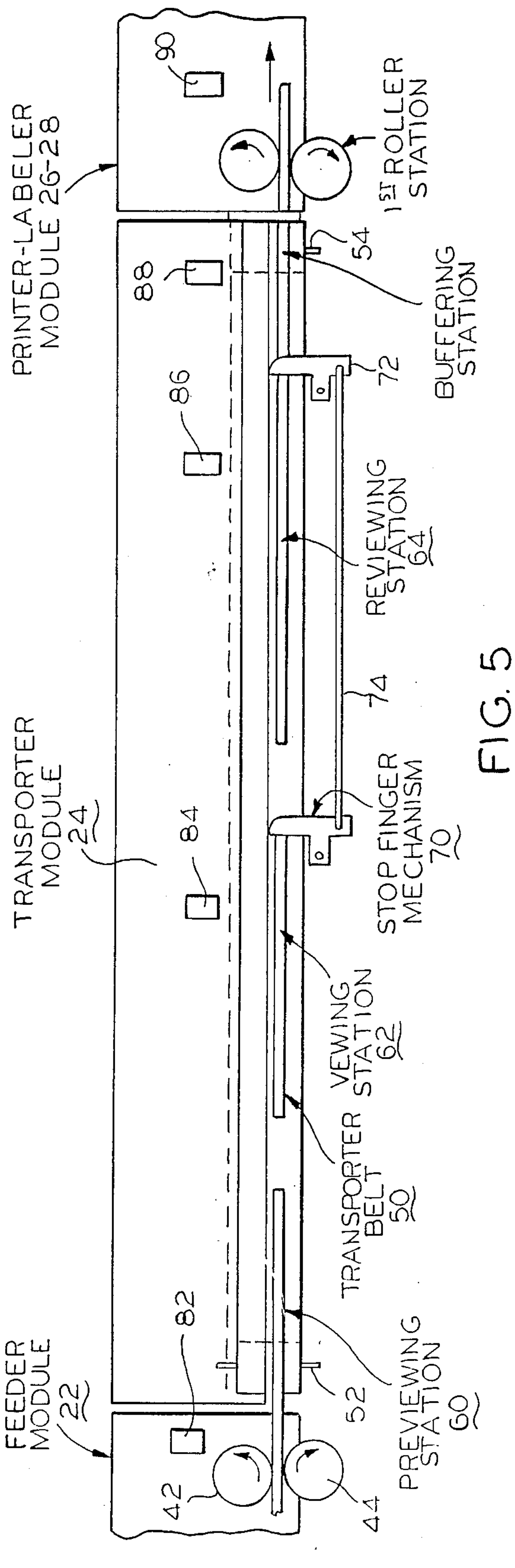
FIG. 5 is a schematic plan view of the transport module shown in FIG. 3.

Referring now to FIG. 5, a plan schematic of the embodiment shown in FIG. 3, the various modules 22–28 include a plurality of sensing means 82–90 that detect the presence or absence of an envelope at a particular station along the belt 50. The presence of an envelope in a particular station will either stop the driver wheels 42–44 from rotating or prevent the fingers 70–74 from releasing an envelope to the buffering station, prior to entry into the printing and labeling module. Additionally, to ensure coordinated movement by the stop fingers 70, 72 a connecting rod 74 can be provided to interconnect them to move simultaneously as a unit.

Figure 4:
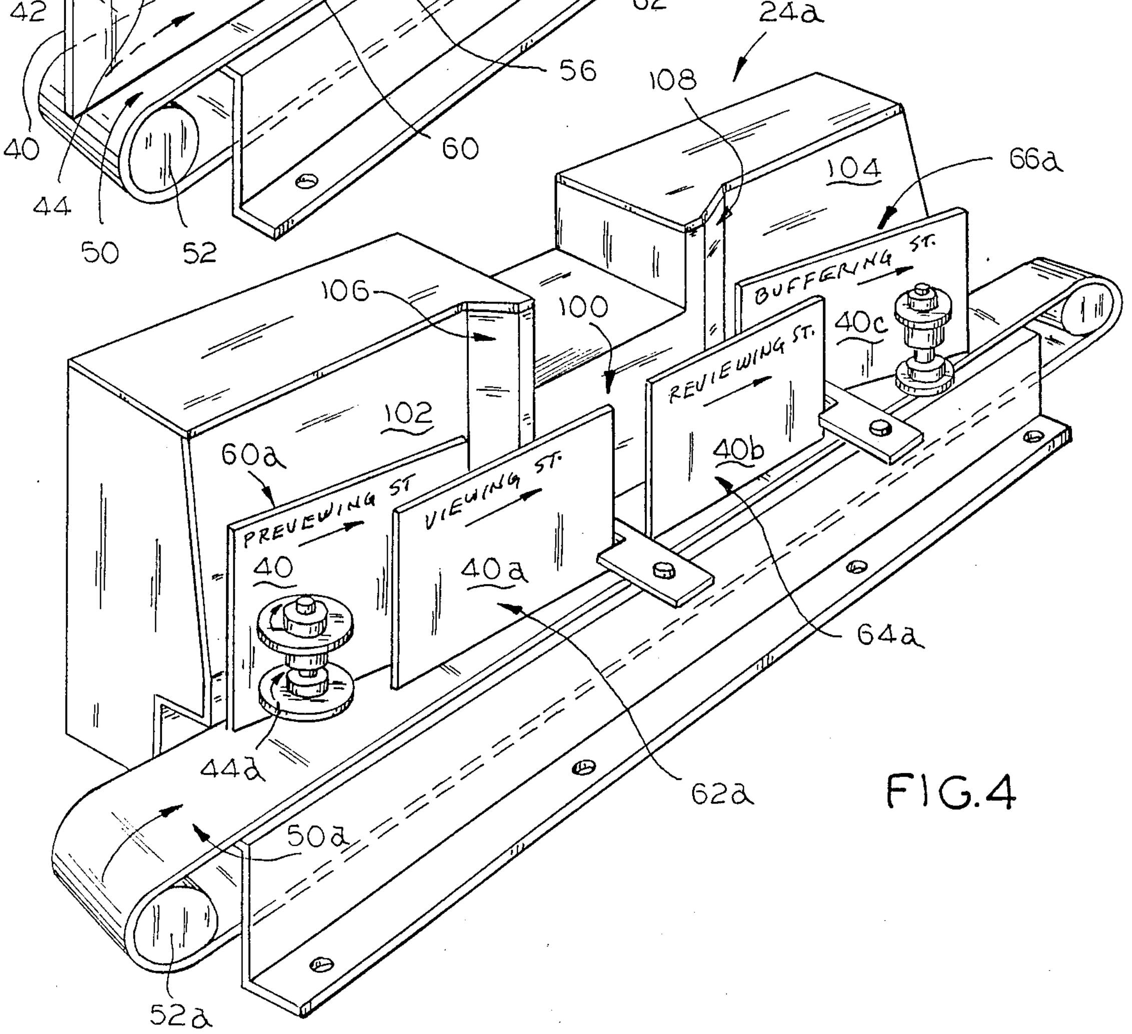
FIG. 4 is a partial perspective view of a second embodiment of the transport module.
Figure 6:
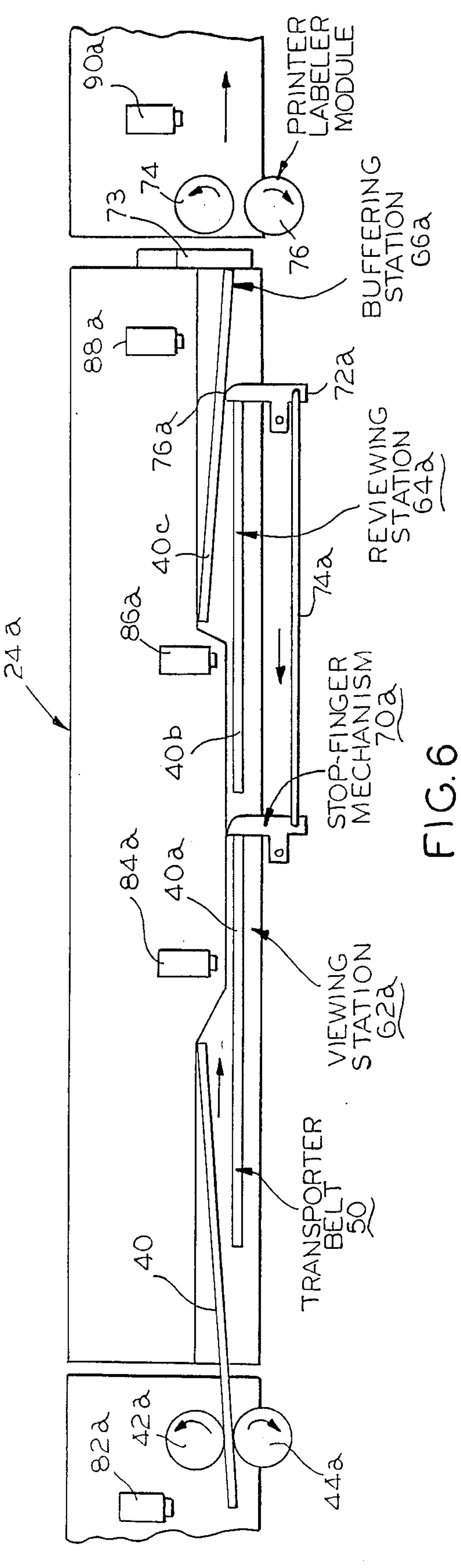
FIG. 6 is a schematic plan view of the second transport module shown in FIG. 4.

Referring now to FIGS. 4 and 6, wherein similar parts are designated by similar numerals with the addition of the suffix "a", a second embodiment of the transport module 24*a* utilizes a foreshortened or shingled configuration. The module 24*a* includes the same four stations, namely, previewing, viewing, reviewing and buffering stations. However, the module includes a central portion 100 which lies in a plane that is positioned forwardly of the plane of the two adjoining first and third portions 102 and 104, respectively. The first portion 102 and the third portion 104 are connected to the central portion 100 by tapered surfaces 106 and 108, respectively. Thus, as can be best seen in the semischematic view in FIG. 6, the first envelope 40 when propelled by the driven roller 44*a* is directed to the previewing station 60*a* located in the recessed portion 102 behind the preceding envelope 40*a* which is positioned in the viewing station 62*a*, which is predominantly located at the central portion 100 in front of the plane of recess 102. As will be noted in FIG. 6, the envelope 40*a*, when positioned in the viewing station 62*a*, extends rearwardly from the central portion and overlaps the next envelope 40 in a shingled effect and with its front edge engaging and temporarily restrained by the rotatable stop 70*a*. Release of the stop member by rotating out of the path of envelope 40*a* results in its passing to the next or reviewing station 64*a* where it assumes the position of envelope 40*b* and is restrained temporarily by stop 72*a*. When release, the envelope then assumes the position of envelope 40*c* in the buffering station 66*a* in a canted position with one end located against the recess wall 104 and restrained by stop means 73, not shown in FIG. 4 but seen in FIG. 6. It should be noted that while an equivalent stop means was not shown in the embodiment of FIGS. 3 and 5, that device can also employ such stop means, if desired.

When the envelope is in the position of the buffering station 66*a* and has been released, the belt 50*a* will move it to the right into the nip of driven roller 74 and idler 76 for movement into the labeler module for application of a label serially printed in a printer module, as generally explained hereinabove.

Referring once again to FIG. 6, it will be noted that a plurality of detector means 82*a*–90*a* are provided in spaced locations along the transport module. For example, detector 84*a* reports the presence or absence of an envelope in the viewing station 62*a*; detector 86*a* reports the presence or absence of an envelope in reviewing station 64*a*; detector 88*a* reports the presence or absence of an envelope in the buffering station 66*a*; and detector 90*a* reports the presence or absence of an envelope in the nip of feed rollers 74–76 at the entrance to the labeler module. The information reported by these detectors, which are commercially available in a wide variety of configurations, is fed to the program controlling the operation of the entire system. When a label has been prepared for a particular piece of mail the envelope is released from the buffering station and driven by rollers 74–76 to the labeler module for application of the label. The movement of belt 50, the stop means 70*a* and 72*a*, interconnected by rod 74*a* are synchronized with the presence or absence of envelopes in their respective locales and additional envelopes are not introduced to the transport module 24*a* from the feeder module 22*a* until the detector 82*a* reports that the position at drive rollers 44*a* is empty and prepared to accept the next envelope.

This second embodiment, as seen in FIGS. 4 and 6, with its shingled arrangement in front of the operator, provides the following advantages, namely, a foreshortening of the length of the transporter module resulting in space saving; it increases productivity of the operator by reducing the time required for exchange of documents between the different positions of the stations; and a further increase in productivity is realized by sensing the back edge of the first document and reacting to the size of the documents presented for action by the operator.

By referring to FIG. 6, it will be noted that the stops 70*a* and 72*a* rotate clockwise to release the documents. When they return to the blocking position, the tip 76*a* of the second stop 72*a* will bear against the envelope 40*c* and cause it to move back into the canted position illustrated and align its front end for delivery to the nip of rollers 74–76 when it is released for further movement.

The next modules are physically interrelated by close proximity, namely, the labeler module 26 and the printer module 28.

It should be recognized that the disposition of the stop means fingers 70–72 and 70*a*–72*a* in the front of the envelopes can be positioned behind the canted panel member 38 and project forwardly from the panel. Similarly, the action of the finger stop means does not have to be limited to a swinging action, but could be linear motion means projecting from the panel member 38, however, the swinging action has been found to be preferable for handling the paper produce encountered in devices of this nature.

I claim:

1. A transporter system including means for handling documents, each having indicia means thereon, and more particularly envelopes of various sizes, said document handling means including a combination viewing and transport module, said module including means for accepting a plurality of documents from a feeding means, means for moving said documents in a sequential fashion through a plurality of stations wherein said documents are substantially simultaneously visible to an operator controlling the system, means for retaining a document at a particular station for a time interval adequate for the operator to react to the indicia means on the document, and means for activating the release of said retaining means, said plurality of stations including a previewing station, a viewing station, a reviewing station, and a buffering station, said document handling means further including electronic storage means, and means for inputing at least a portion of the indicia means visible on said document from the viewing station into said electronic storage means, whereby said document is released to said reviewing station where said storage means compares the portion of the indicia means with other information available in said storage means and provides a retrieval of at least one piece of information for use in correction of the indicia means on said document, and if there is more than one piece of information which fits the parameters of the portion of the indicia means input, then the operator is supplied with said multiple information for choosing the correct information, the operator thereby releasing said document from said reviewing station and moving same to said buffering station.

2. A system of the type set forth in claim 1 wherein said information is provided in a visual display.

3. A system of the type set forth in claim 2 wherein said display is on a CRT and interconnected with a micro-computer and keyboard which said operator can manipulate to input and receive data therefrom.

4. A system of the type set forth in claim 1 wherein said information is provided in an audible display.

5. A system of the type set forth in claim 1 wherein said stations are linearly oriented.

6. A system of the type set forth in claim 5 wherein said means for moving said documents is disposed along the horizontally disposed longitudinal axis of said transport module, said module means for retaining a document at a particular station for a time interval includes control means.

7. A system of the type set forth in either claim 6 wherein said means for moving said documents includes a movable conveyor means movable along said longitudinal axis of said transport module, and said control means including means projecting into the path followed by said document as carried by said conveyor means to retain an individual document at a predetermined station for examination and review.

8. A system of the type set forth in claim 7 wherein at least two of said control means are connected together for coordinated action.

9. A system of the type set forth in claim 8 wherein said control means are mechanical gates that are physically interposed in the path of the documents moving on said conveyor means.

10. A system of the type set forth in claim 9 wherein said conveyor means is a horizontally disposed belt means capable of supporting said document means and movable at least a predetermined distance to carry said document from station to station when said gates are removed from the path of the documents.

11. A system of the type set forth in claim 10 wherein said belt means is continuously moving and frictionally slips under said documents when they are restrained by said gates and moves said documents when the gates are removed to a retracted position relative to the path of said documents.

12. A document transporter system for accepting serially disposed end to end individual documents one at a time from a document feed system and sequentially moving each document to a plurality of stations for substantially simultaneous observation by an operator, each document having indicia means thereon, said transporter system comprising means for accepting a document from a document feed system, means for moving a plurality of documents in a sequential fashion through said plurality of stations, wherein said plurality of stations includes means for previewing a first document, means for substantially simultaneously viewing a second document, and means for substantially simultaneously reviewing a third document, said transporter system further comprising means for retaining a document at a particular station for a time interval adequate for the operator to react to the indicia means on the document, and means for activating the release of said retaining means to advance said document to a further station.

13. The document transporter system of claim 12 including electronic storage means, and means for feeding an abbreviated version of said indicia means visible on each said document in a particular station into said electronic storage means which compares said abbreviated version of said indicia means with information available in data storage means associated with the transporter system and provides a retrieval of at least one piece of information for use in correction of the indicia means on said document, and whereby if there is more than one piece of information which fits the parameters of the abbreviated version of said indicia means, the operator is supplied with such multiple information for a predetermined time interval for choosing the correct information, releasing said document from said particular station, and moving said document to said further station.

14. The document transporter system of claim 13 including visual information display means comprising a CRT interconnected with a micro-computer and a keyboard which said operator can manipulate to input and receive data therefrom.

15. The document transporter system of claim 12 wherein said stations are linearly oriented.

16. A system of the type set forth in claim 15 wherein said means for moving said documents is disposed along the horizontally disposed longitudinal axis of said transport module, and wherein said retaining means includes control means.

17. A system of the type set forth in claim 16 wherein said means for moving said documents includes a movable conveyor means movable along said longitudinal axis of said transport module, and said control means including means projecting into the path followed by said document as carried by said conveyor means to retain an individual document at a predetermined station for examination and review.

* * * * *

UNITED STATES PATENT AND TRADEMARK OFFICE

CERTIFICATE OF CORRECTION

PATENT NO. : 4,979,605

DATED : December 25, 1990

INVENTOR(S) : Eduard Svyatsky

It is certified that error appears in the above-identified patent and that said Letters Patent is hereby corrected as shown below:

Column 1, line 18, delete "category the" and insert --category, the --.

Column 1, line 39, delete "computer- operator" and insert --computer-operator--.

Column 2, line 56, delete "system,," and insert --system,--.

Column 4, line 26, delete "envelope" and insert --envelopes--.

Column 4, line 50, delete "go the" and insert --to the--.

<u>In the Claims</u>

Column 7, line 17, delete "either".

Signed and Sealed this

First Day of September, 1992

*Attest:*

DOUGLAS B. COMER

*Attesting Officer*

*Acting Commissioner of Patents and Trademarks*